June 25, 1940.   J H. HUNT ET AL   2,205,653
VEHICLE WHEEL
Filed Sept. 18, 1937
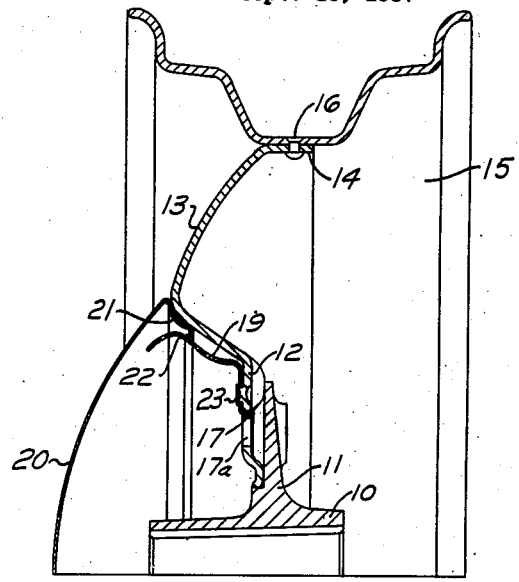
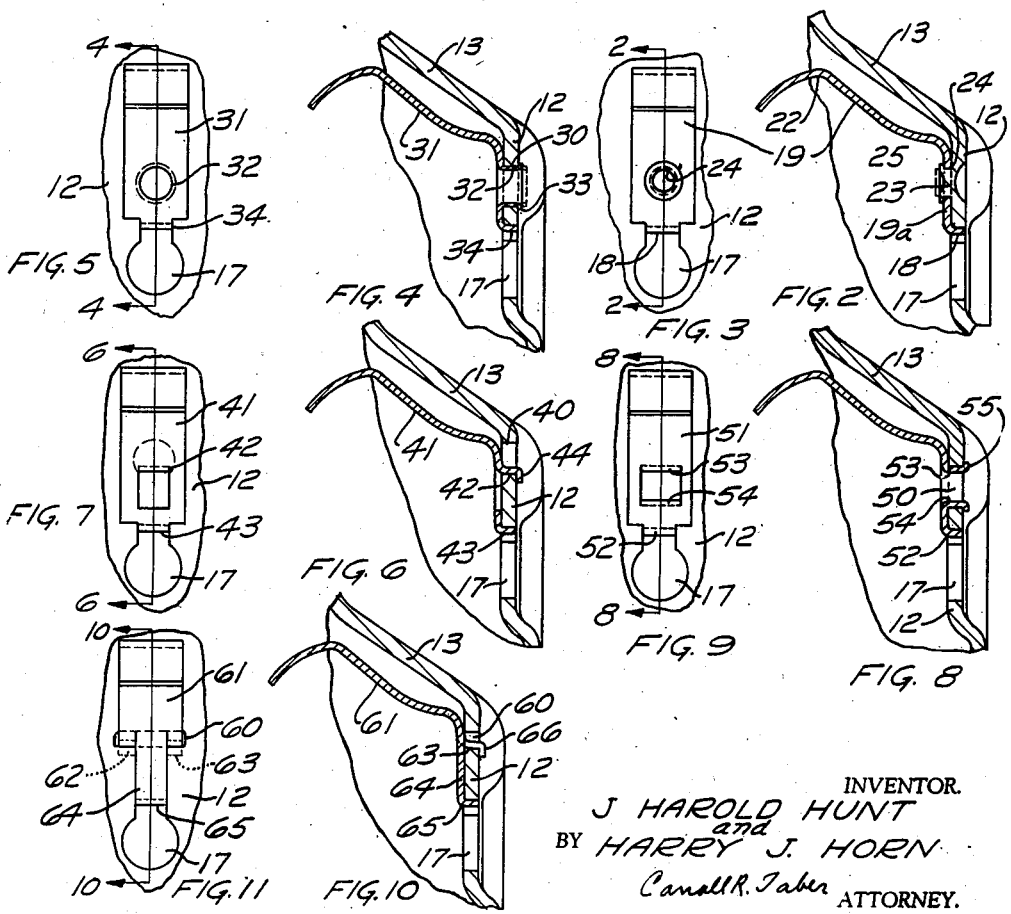
INVENTOR.
J HAROLD HUNT
and
BY HARRY J. HORN
Carroll R. Taber ATTORNEY.

Patented June 25, 1940

2,205,653

UNITED STATES PATENT OFFICE 2,205,653

VEHICLE WHEEL

J Harold Hunt and Harry J. Horn, Lansing, Mich., assignors to Motor Wheel Corporation, Lansing, Mich., a corporation of Michigan Application September 18, 1937, Serial No. 164,448

3 Claims. (Cl. 301—108)

This invention relates to vehicle wheels, and more particularly to the clips for securing a wheel cover in place on the wheel.

An object of the invention is to provide a novel means for holding a wheel cover retaining clip in place on a vehicle wheel.

Other objects will appear in the following specification when read in connection with the accompanying drawing wherein like reference numerals designate corresponding parts in the several views.

In the drawing:

Figure 1 is a fragmentary cross-sectional view of a wheel embodying our invention;

Figure 2 is a fragmentary vertical sectional view on an enlarged scale of a portion of the wheel and the retaining clip shown in Figure 1;

Figure 3 is a fragmentary front elevational view of the clip shown in Figure 2;

Figures 4 and 5 are respectively fragmentary cross-sectional and front elevational views of a modified form of the invention;

Figures 6 and 7 are respectively cross-sectional and front elevational views of another modification of the invention;

Figures 8 and 9 are respectively cross-sectional and front elevational views of still another modified form of the invention; and Figures 10 and 11 are respectively cross-sectional and front elevational views of another form of the invention.

Referring now more particularly to Figures 1 to 3, there is shown a wheel comprising a hub 10 having a radially extending flange 11 to which a bolting on flange 12 of a wheel body portion 13 is demountably attached by any suitable means (not shown). The outer peripheral edge of the wheel body portion 13 extends substantially axially to form a rim seat portion 14 to which a rim 15 of the drop center type is rigidly secured by a plurality of rivets 16.

The bolting on flange 12 of the wheel body 13 has a plurality of spaced apertures 17 concentric with the axis of the hub 10 for the reception of a locating pin 17a extending axially outwardly from the flange 11. It will be noted particularly from Figure 3 that the apertures are of generally key-hole shape, and the pin 17a extends through the circular portion thereof. The rectangular portion of each aperture 17 is adapted to receive a tongue 18 formed on the end of a clip 19 which will be described presently.

The clips 19 are adapted to removably secure a cover to the wheel. The cover 20 has a flange 21 extending both radially and axially inwardly from the outer periphery thereof. The flange 21 of the cover plate is forced axially inwardly over the hump 22 on each spring clip 19 and is gripped between the wheel body portion 13 and the clip 19.

The novel means for securing the clip to the bolting on flange 12 includes a cylindrical projection 23 which is formed integrally with the bolting on flange 12. The metal of the bolting on flange is preferably extruded through a die (not shown) to form the projection 23, and it may be formed during one of the operations involved in stamping the wheel body. A circular aperture 24 is formed in the radially extending portion of the clip 19 for the reception of the projection 23. At the radially inner end of the clip 19 is a tongue 18, formed integrally therewith and bent laterally from the body portion of the clip. The clip is secured to the bolting on flange of the wheel body 13 by inserting the projection 23 in the aperture 24, and the tongue 18 in the upper end of the aperture 17, and then riveting the end of the projection over as at 25. The tongue 18 is not deformed in any way after its insertion in the aperture 17. The purpose of this tongue is to prevent rotation of the clip about the projection 23, thereby keeping it permanently in operative position.

In the modification shown in Figures 4 and 5 the bolting on flange 12 of the wheel body 13 is formed with an aperture 30 in addition to the aperture 17. The clip 31 is provided with a drawn tubular portion 32 formed integrally therewith, which is adapted to be inserted in the aperture 30. The lower end of the clip 31 has a tongue 34 similar to the tongue 18 of the clip shown in Figures 1 to 3. The tubular portion 32 is inserted in aperture 30, and the tongue 34 in aperture 17, and the inner end of tubular portion 32 is then expanded at 33 to securely hold the clip 31 to the bolting on flange 12.

In the construction shown in Figures 6 and 7 the bolting on flange 12 is provided with an aperture 17 as in the aforementioned constructions, and in addition has a circular aperture 40 for the reception of the clip securing means. The clip 41 has an integral tab 42 which is formed by striking it from the main body portion of the clip, so that it extends laterally thereof. The lower end of the clip 41 is also provided with a tongue 43. The clip is installed by inserting the tab 42 and tongue 43 through apertures 40 and 17 respectively and then bending the inner end of the tab 42 over as shown at 44 whereby the clip is rigidly retained in position. It will be noted that in this modification the aperture 40 is concealed by the main body of the clip.

The structure shown in Figures 8 and 9 is similar to the modification shown in Figures 6 and 7. Apertures 17 and 50 are formed in the bolting on flange 12 and are adapted to receive the clip securing means. Aperture 50 is of rectangular shape. The clip 51 has a tongue 52 at its lower end, and spaced somewhat above the tongue 52 are two tabs 53 and 54, both of which are struck from the main body of the clip 51. The tongue 52, and tabs 53 and 54 are inserted through the apertures 17 and 50 respectively, and the ends of the tabs 53 and 54 are then bent over at their inner ends as shown at 55 and 56 respectively, in order to permanently attach the clip to the bolting on flange 12.

Figures 10 and 11 show still a further modification of the invention. An aperture 17 is provided in the bolting on flange 12 in the same manner as heretofore described, and a rectangular aperture 60 is provided in the bolting on flange somewhat above the aperture 17. The clip 61 has two prongs 62 and 63 which are struck from the edges of the clip, thereby leaving the intermediate strip 64 which extends substantially parallel with the bolting on flange 12. The lower end of the strip 64 is bent to form a tongue 65 adapted for insertion in the rectangular portion of the aperture 17. The two prongs 62 and 63 are inserted in the aperture 60, and the tongue 65 in aperture 17, and the prongs 62 and 63 are then bent over as at 66 to lock the clip to the wheel body. In this modification the aperture 60 is covered and concealed by the body of the clip 61.

The means for retaining the various clips to the bolting on flange of the wheel body are considerably cheaper to manufacture than the means heretofore used. In prior devices the clips were usually attached by means of separate rivets which necessitated the assembling of three parts together, namely, the wheel body portion, the clip, and the rivet. More operations were therefore necessary in assembling the parts of the prior devices than are needed in assembling the clip and the wheel body of this invention. The various fastening devices formed on the clips above described can be stamped out at the same time as the rest of the clip is formed, thereby requiring but one operation to manufacture the clip. They can be readily assembled by merely inserting the fastening devices through the apertures and deforming them against the inner face of the bolting on flange.

It will, therefore, be seen that we have provided a novel clip securing means that is inexpensive and very simply and easily assembled.

The scope of the invention is indicated by the appended claims.

We claim:

1. In a vehicle wheel, in combination, a wheel body having a pair of radially spaced apertures therein whereby to form a narrow anchor strip therebetween integral with the wheel body, a cover securing clip formed from an elongated strip of metal having an attaching portion juxtaposed to said wheel body, one end of said attaching portion being bent perpendicular thereto and received in one of said apertures, an integral tongue intermediate the ends of the attaching portion extending through the other aperture and having its free end bent toward the first mentioned end of the said attaching portion whereby the anchor strip is securely gripped by the attaching portion of the clip to secure the latter to the wheel body.

2. In a vehicle wheel, in combination, a wheel body having a pair of radially spaced apertures therein whereby to form a narrow anchor strip therebetween integral with the wheel body, a cover securing clip formed from an elongated strip of metal having an attaching portion juxtaposed to the outer surface of said wheel body, one end of said attaching portion being bent perpendicular to said attaching portion and received in one of said apertures, said end engaging an axially extending surface of said anchor strip, an integral tongue intermediate the ends of the attaching portion extending through the other aperture and engaging an axially extending surface of the anchor strip, the free end of said tongue being bent toward the first mentioned end of the attaching portion and engaging the axially inner surface of the anchor strip whereby the anchor strip is securely gripped on all four surfaces by the clip in order to secure the same against relative movement in all directions.

3. The combination defined in claim 2, in which the tongue intermediate the ends of the attaching portion is struck out of the main body of the attaching portion.

J HAROLD HUNT.
HARRY J. HORN.